Feb. 16, 1926.
J. D. PARDOE
1,572,947
MOTOR LOCK
Filed Jan. 30, 1925
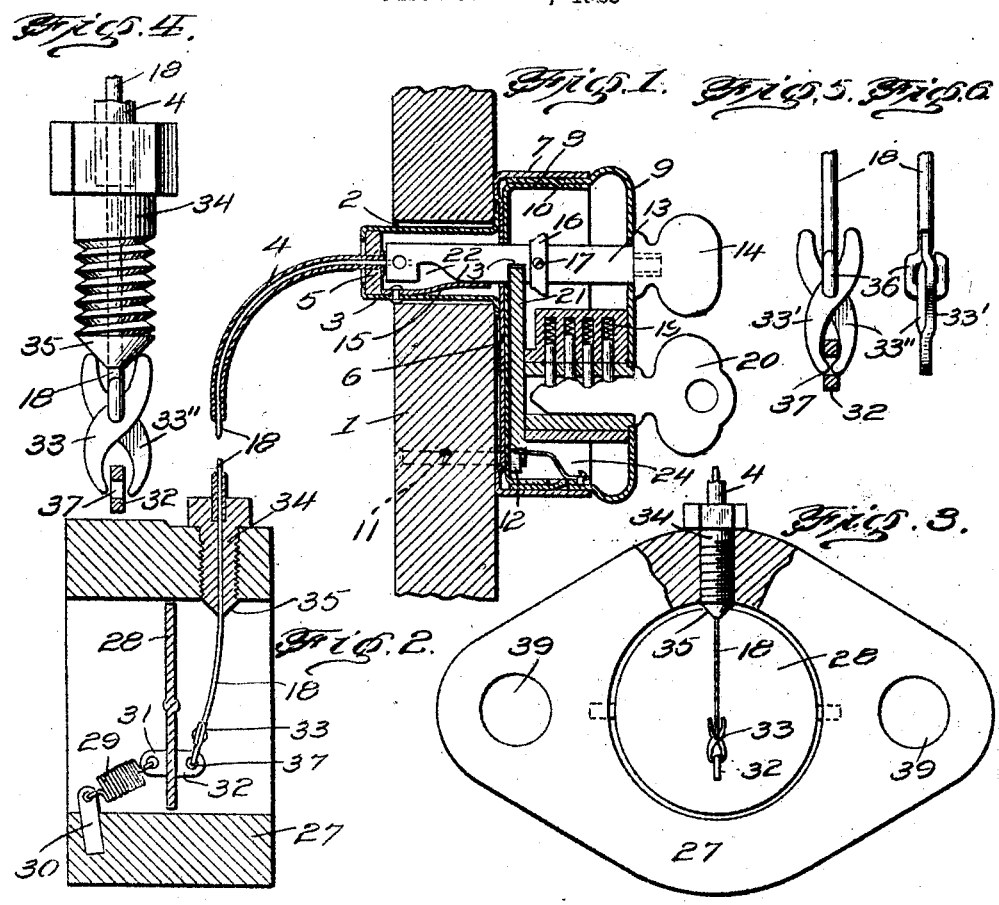
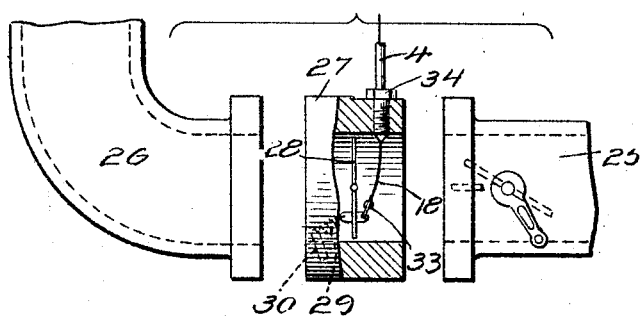
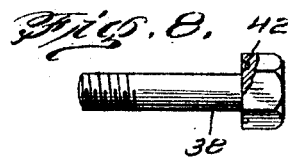
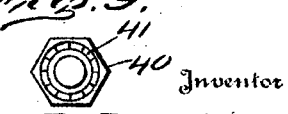
Inventor
John D. Pardoe.
By Townsend & Townsend
Attorney Patented Feb. 16, 1926.

1,572,947

UNITED STATES PATENT OFFICE.

JOHN D. PARDOE, OF MEMPHIS, TENNESSEE, ASSIGNOR OF ONE-HALF TO ROBT. T. CAMERON, OF MEMPHIS, TENNESSEE.

MOTOR LOCK.

Application filed January 30, 1925. Serial No. 5,903.

*To all whom it may concern:*

Be it known that I, JOHN D. PARDOE, a citizen of the United States, residing at Memphis, in the county of Shelby and State of Tennessee, have invented certain new and useful Improvements in Motor Locks, of which the following is a specification.

My invention relates to anti-theft devices for automobiles, motor boats, air craft, and all types of vehicles propelled by internal combustion engines.

The primary object of the invention is the provision of a novel and improved motor lock controlling the passage of fuel to the motor in either gaseous or liquid form.

Another object is the provision of a motor lock arranged for automatic locking when the mechanism thereof is subjected to unauthorized tampering or manipulation.

A further object is the provision of such a lock wherein the operating mechanism may be adjusted for predetermined limits of authorized movement.

A still further object is the provision of an encased locking mechanism adapted for mounting on the instrument board of automobiles in such manner that removal of the casing automatically throws the lock to closed position.

With these and such other objects in view as will be apparent from the description, my invention resides in the novel construction, combination and arrangement of parts hereinafter described and claimed, and illustrated in the accompanying drawings, wherein:—

Figure 1 is a vertical section through a lock as mounted on an instrument board;

Figure 2, a section through a fuel passage conduit with an element of the lock in closed position;

Figure 3, an end view, partly in section from the right of Figure 2;

Figure 4, an elevation of a trip hook release means;

Figure 5, an elevation of the trip hook;

Figure 6, a similar elevation at a right angle to Figure 5;

Figure 7, an elevation, partly in section, of a fuel conduit assembly;

Figure 8, an elevation of a fastening bolt employed, and

Figure 9, an end view of a locking nut used in conjunction with the bolt.

In the application of the invention, the instrument or dash board 1 of an automobile, is provided with a bore 2 to receive therethrough a tube 3 perforated at one end for passage therethrough of a flexible conduit 4 having its end attached to an anchor block 5 closing the end of the tube. The opposite end of tube 3 is outwardly flanged to seat against the adjacent face of the dash and the tube is retained in position by the flat rear wall 6 of a cupped casing body 7. The body 7 of the casing is provided with an inner and similarly formed shell 8 the side walls of which are spaced slighty from the body 7 to receive therebetween a casing cover 9 having upstruck spring tongues 10 for locking engagement in perforations formed in the inner shell 8 when the cover is applied. The two sections of the casing are secured together and the entire assembly clamped on the dash board by means of fastening bolts 11, of which there may be one or more as desired, passed through the dash and back of the casing to receive the locking nuts 12 applied from within the casing before the cover is locked on.

Slidably disposed through the casing cover 9 and extending through the back of the casing into the tube 3, is a lock operating control rod 13 provided with an enlarged handle grip 14 on its outer end whereby the rod may be moved in and out relative to the casing. The inner end of the control rod is guided and supported in the tube 3 by means of a leaf spring 15 carried by the tube.

Within the casing the control rod is provided with a shoulder to limit outward movement thereof, in the form of a sleeve 16 adjustable longitudinally on the rod for a predetermined setting by means of the set screw 17, and connected to the inner end of the control rod is a flexible wire 18 movable, and extending through the conduit 4.

Secured on the inner face of the casing cover is a tumbler lock 19 provided with its key 20 and having a bolt bar 21 slidably disposed against the rear wall of the casing for engagement in either of notches 22 and 23 formed in the control rod 13. The bolt is retained in engaged position by pressure of the leaf spring 24 carried by the casing and supporting the lower end of the bolt. Through manipulation of the lock 19 the control rod 13 may be locked in either retracted or extended position, the retracted position being illustrated in Figure 1.

The fuel passage to the motor is controlled by means of a tubular section adapted to be inserted in the pipe line at the desired point, preferably as shown between the carburettor 25 and the intake manifold 26, which section designated as 27 is provided with a butterfly valve 28 normally retained in closed position by means of a coil retraction spring 29 having one terminal attached to an anchor lug 30 in the wall of the section, and its other terminal attached to a lug 31 extending from the adjacent face of the valve 28, which connection maintains the valve in closed position.

The lug 31 is continued on the opposite face of the valve in an oppositely extending lug 32 to which is secured by means of a trip hook 33, the free end of the flexible wire 18 extending from the control rod 13. The wire 18 is introduced in the section 27 through a bushing 34 threaded through a wall thereof and having its inner end formed in a cone shaped portion 35 extending within the passage.

The construction of trip hook 33 is best shown in Figures 4, 5 and 6, and it is formed of a pair of crossed arms 33' and 33" pivoted at their point of intersection on the bent terminal 36 of the wire 18. These arms are hooked at one end for engagement in their normal position in the eyelet 37 of lug 32, whereby the wire 18 is attached to the lug for operation of the valve 28. The opposite ends of the trip hook arms are so spaced, that upon engagement with the cone end 35 of the bushing 34, they will be forced apart to open the hook and release the lug 32, permitting spring 29 to snap the valve back to normal closed position.

In assembling the fuel passage arrangement, the section 27 is secured in the pipe line by means of the bolts 38 passed through the bores 39 and adjacent carburettor and manifold flanges, and anchored by nuts 40, the locking faces of which are provided with a series of notches 41 whereby means may be provided to lock the nuts against removal. Similar notches 42 are formed in the head of bolts 38.

In the operation of my invention, the parts are assumed to be in their normal or valve closed position as shown in Figures 1 and 2, whereby the flow of gas to the motor is cut off. When an operator desires to start the engine, lock 19 is manipulated to withdraw bolt 21 from the control rod notch 23, and the rod is pulled out until arrested by engagement of the shoulder 16 with the wall of the cover, the shoulder having been so set that the travel of the rod and consequently wire 18, will stop at a point whereat the trip hook 33 will not engage the cone 35. The pull on rod 13 will through the wire 18, open the valve as described and the bolt 21 may then be engaged with control rod notch 22 to lock the valve in open or running position. On release of bolt 21 from the notch 22, the control rod may be pushed inwardly, allowing spring 29 to close the valve, and the parts again locked in closed position as first described.

If an unauthorized person succeeds in picking lock 19 and pulls out rod 13, the rod cannot be locked in open position, and if a further pull is made, the shoulder will slide over the rod permitting continued outward movement thereof to bring the trip hook into engagement with the cone 35, opening the arms and allowing the spring 29 to snap the valve into permanent closed position, necessitating a dismantling of the assembly to reopen. The same result will follow should the casing be forcibly removed from the dash.

While in this preferred form of the invention I have shown and described the lock as applied to automobiles and between the carburettor and intake manifold, I desire it to be understood that the invention is not limited to such application and use. It is obvious that if desired the lock attachment may be connected directly with a spring closed fuel feed valve in any of the various conventional positionings of the same. It is my intention that any desired modifications and changes in the details thereof may be made as will fall within the scope of the invention as claimed.

I claim:—

1. A motor lock comprising a spring closed valve disposed in a fuel feed line, a flexible actuating wire extending from said valve for operation thereof, a lock casing, a control rod movable therein and connected with said valve actuating wire, means on said rod for a predetermined adjustment of movement thereof, means in said casing for locking said rod in a plurality of positions, and means for automatically closing said valve on movement of said rod in one direction beyond the predetermined setting thereof.

2. A motor lock comprising a casing adapted for disposition on an automobile dash board, a rod movable into and out of said casing, means in said casing for locking said rod in extended or retracted position, means in said casing for adjustably regulating the travel of said rod, a spring closed fuel feed valve, a connector between said rod and valve for opening said valve on movement of said rod in one direction, and means for releasing said connector for automatic closing of said valve on movement of said rod beyond the predetermined limit of travel in one direction.

3. A motor lock comprising a spring closed fuel feed valve, operating means therefor adapted to be locked in various predetermined positions, a pivoted connection between the valve and operating means, and means to automatically release the connection to permit closing of the valve upon undue movement of the operating means.

4. A motor lock comprising a spring closed fuel feed valve, operating means therefor adapted to be locked in various predetermined positions, a releasable grapple connecting the valve and operating means, and means to automatically release the grapple upon undue movement of the operating means to permit closing of the valve.

5. A motor lock comprising a spring closed fuel feed valve, operating means therefor adapted to be locked in various predetermined positions, a pivoted hook connecting the valve and operating means, and a stationary cam engageable by the free end of the hook upon undue movement of the operating means to release the valve.

In testimony whereof I affix my signature.

JOHN D. PARDOE.